US009984785B2

(12) United States Patent
Roberson et al.

(10) Patent No.: US 9,984,785 B2
(45) Date of Patent: May 29, 2018

(54) INKJET PRINTING OF CONDUCTIVE CARBON NANOTUBES

(75) Inventors: Luke B. Roberson, Titusville, FL (US); Martha K. Williams, Titusville, FL (US); Tracy L. Gibson, Melbourne, FL (US); LaNetra C. Tate, Oviedo, FL (US); Sarah J. Snyder, Terre Haute, IN (US); Craig R. Fortier, Cocoa, FL (US)

(73) Assignee: The United States of America as Represented by the Administrator of NASA, Washinton, DC (US)

(*) Notice: Subject to any disclaimer, the term of this patent is extended or adjusted under 35 U.S.C. 154(b) by 1593 days.

(21) Appl. No.: 13/278,710

(22) Filed: Oct. 21, 2011

(65) Prior Publication Data

US 2012/0111599 A1    May 10, 2012

Related U.S. Application Data

(60) Provisional application No. 61/410,467, filed on Nov. 5, 2010.

(51) Int. Cl.
*H01B 1/02* (2006.01)
*H01B 1/04* (2006.01)
(Continued)

(52) U.S. Cl.
CPC .............. *H01B 1/04* (2013.01); *B82Y 30/00* (2013.01); *H01B 1/02* (2013.01); *B05D 1/26* (2013.01);
(Continued)

(58) Field of Classification Search
CPC ........ B05D 1/26; B05D 5/12; C23C 12/1262; C23C 18/61; C23C 18/18
(Continued)

(56) References Cited

U.S. PATENT DOCUMENTS 6,312,303 B1 * 11/2001 Yaniv et al. .................... 445/24
7,569,160 B2    8/2009 Oldenzijl et al.
(Continued)

FOREIGN PATENT DOCUMENTS

WO    WO 2008/092696    * 8/2008

OTHER PUBLICATIONS

Shi, et al., "A Conducting Polymer Film Stronger Than Aluminum," Science (1995), 267, p. 994-996.
(Continued)

*Primary Examiner* — Brian K Talbot
(74) *Attorney, Agent, or Firm* — Michelle L. Ford; Mark P. Dvorscak

(57) ABSTRACT

Systems and methods for forming conductive materials. The conductive materials can be applied using a printer in single or multiple passes onto a substrate. The conductive materials are composed of electrical conductors such as carbon nanotubes (including functionalized carbon nanotubes and metal-coated carbon nanotubes), grapheme, a polycyclic aromatic hydrocarbon (e.g. pentacene and bisperipentacene), metal nanoparticles, an inherently conductive polymer (ICP), and combinations thereof. Once the conductive materials are applied, the materials are dried and sintered to form adherent conductive materials on the substrate. The adherent conductive materials can be used in applications such as damage detection, particle removal, and smart coating systems.

4 Claims, 12 Drawing Sheets

(51) Int. Cl.
*B82Y 30/00* (2011.01)
*B05D 5/12* (2006.01)
*C23C 18/12* (2006.01)
*B05D 1/26* (2006.01)
*C23C 18/18* (2006.01)
*C23C 18/31* (2006.01)
*B41M 3/00* (2006.01)
*B41M 5/00* (2006.01)

(52) U.S. Cl.
CPC ............. *B05D 5/12* (2013.01); *B41M 3/006* (2013.01); *B41M 5/0023* (2013.01); *C23C 18/1262* (2013.01); *C23C 18/18* (2013.01); *C23C 18/31* (2013.01)

(58) Field of Classification Search
USPC .......... 427/97.1, 97.3, 97.4, 98.4, 99.2, 122, 427/123, 189–192, 197, 383.1, 466
See application file for complete search history.

(56) References Cited

U.S. PATENT DOCUMENTS

| | | | |
|---|---|---|---|
| 7,572,743 B2 * | 8/2009 | Rinzler et al. | 438/800 |
| 7,821,079 B2 | 10/2010 | Cho et al. | |
| 8,062,697 B2 | 11/2011 | Yaniv et al. | |
| 2004/0013597 A1 * | 1/2004 | Mao et al. | 423/447.1 |
| 2004/0197546 A1 * | 10/2004 | Rinzler et al. | 428/311.51 |
| 2004/0241896 A1 * | 12/2004 | Zhou et al. | 438/48 |
| 2006/0126175 A1 * | 6/2006 | Lu et al. | 359/460 |
| 2007/0151744 A1 * | 7/2007 | Chen | 174/110 R |
| 2008/0212246 A1 | 9/2008 | Tanaka et al. | |
| 2009/0072013 A1 * | 3/2009 | Natekar et al. | 228/253 |
| 2010/0102280 A1 * | 4/2010 | Ford et al. | 252/502 |
| 2010/0170695 A1 * | 7/2010 | Tsotsis | 174/126.1 |
| 2011/0011629 A1 | 1/2011 | Trigwell et al. | |
| 2011/0048772 A1 | 3/2011 | Han | |
| 2012/0052436 A1 * | 3/2012 | Law et al. | 430/125.3 |
| 2012/0147448 A1 * | 6/2012 | Yaniv et al. | 359/265 |

OTHER PUBLICATIONS

Wang, et al., "Carbon nanotube screen-printed electrochemical sensors," Analyst (2004), 109, p. 1-2.

Huang, et al., "Self-organizing high-density single-walled carbon nanotube arrays from surfactant suspensions," Nanotechnology 15 (2004), p. 1450-1454.

Kordas, et al., "Inkjet Printing of Electrically Conductive Patterns of Carbon Nanotubes," Small (2006), 2, No. 8-9, p. 1021-1025.

Beecher, et al., "Ink-jet printing of carbon nanotube thin film transistors," Journal of Applied Physics 102 (2007), 043710.

"Copper Powder Consolidation Techniques." Industrial: Powder Metallurgy-. Copper Development Association, Inc., n. d. Downloaded from web Apr. 30, 2014. URL http://www.copper.org/resources/properties/129_6/consolidation.html.

* cited by examiner

INKJET PRINTING OF CONDUCTIVE CARBON NANOTUBES

CROSS-REFERENCE TO RELATED APPLICATIONS

This application claims the benefit under 35 U.S.C. § 119(e) of U.S. Provisional Application Ser. No. 61/410,467, filed on Nov. 5, 2010, the contents of which are incorporated herein by reference.

ORIGIN OF INVENTION

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Inkjet printing is a common commercial process. In addition to the familiar use in printing documents from computers, it is used in some industrial applications. Wire manufacturers are required by law to print the wire type, gauge, and safety information on the exterior of each foot of manufactured wire, and this is typically done with inkjet or laser printers.

Poly(3,4-ethylenedioxythiophene) or PEDOT is a conjugated polymer based on polythiophene. It is inherently conductive, or intrinsically conductive, and has been used in organic solar cells and electronic displays. It has been applied with inkjet printing and by other techniques. Conductive materials, such as carbon nanotubes, have also been applied to various substrates by printing methods. Although these technologies proved successful for some electronic circuitry applications, the high resistance or lower conductivity in the prior art are not adequate for most uses, including the more demanding applications such as damage detection systems.

New materials and methods of manufacturing electronic circuitry with low resistance (or improved conductivity) are needed. Conductive materials applied by printing have had high resistance in the prior art and have been insufficiently conductive for most uses.

New methods of manufacturing electronic circuitry are needed. Conductive materials applied by printing methodologies with increased conductivity are needed.

SUMMARY OF THE INVENTION

In addressing wiring technologies for potential aerospace applications suitable for National Aeronautics and Space Administration (NASA) missions, the inventors investigated the feasibility of printing conductive inks for integration as damage detection layers for use in an in-situ wire damage detection system or multi-dimensional damage detection system for flat surfaces.

One embodiment of the invention provides a method of forming a conductive material comprising: applying a conductive ink with a printer in single or multiple passes onto a substrate; wherein the conductive ink comprises an electrical conductor selected from the group consisting of: carbon nanotubes (including functionalized carbon nanotubes and metal-coated carbon nanotubes), graphene, a polycyclic aromatic hydrocarbon (e.g., pentacene and bisperipentacene), metal nanoparticles, an inherently conductive polymer (ICP), ionic liquid, and combinations thereof; and drying the conductive ink on the substrate to form an adherent conductive material on the substrate.

The inventors demonstrated that electrical conductors, for example carbon nanotubes (CNTs), metal nanoparticles, and inherently conductive polymers (ICPs) such as polyaniline and polythiophene can be dissolved or dispersed in a polar solvent (e.g., an aqueous solvent) to form a conductive ink, and the conductive ink can be applied in multiple passes with an inkjet printer to a polymeric, glass, fabric, or ceramic substrate to create layers with better conductivity than previously attained.

In another discovery, taking advantage of the intrinsic magnetic properties of CNTs and metallic nanoparticles, the inventors found that when the conductive ink was directly printed on a magnetic substrate or exposed to a low-level magnetic field during the applying step (the magnetic field originating from a source other than the substrate), or both, an adherent conductive material layer was produced with decreased surface resistivity over that of applying without magnetic influence.

The inventors demonstrated that unique combinations of electrical conductors in ink formulations applied by printers give even lower resistivities than individual conductors alone—changes of more than an order of magnitude were found when using combinations of conductors.

By applying alternating layers of different electrical conductors to form a layered composite material, the layered composite material should be even more conductive than a single homogenous layer or a series of identical layers of the less conductive material used in the composite. It is believed that patterning alternate layers of different conductors may improve electrical pathways through alignment of the conductors and band gap optimization.

Thus, in one embodiment of the method of forming a conductive material, the adherent conductive material comprises a plurality of layers, wherein each layer is formed by applying a conductive ink in at least one pass, wherein at least two adjoining layers comprise different electrical conductors or different combinations of electrical conductors.

Another finding was that a composite material comprising a mixture of CNTs and silver or gold nanoparticles could be applied by inkjet printing to flexible substrates, and the resulting applied material was 1 to 2 orders of magnitude more conductive than a material made by printing CNTs alone.

Thus, in another embodiment, the conductive ink comprises a mixture of carbon nanotubes and metal nanoparticles.

In another embodiment, the conductive ink comprises a mixture of carbon nanotubes, metal nanoparticles, ionic liquids, or anti-agglomeration agents and mixtures thereof.

Another system demonstrated was that composite material comprising a mixture of functionalized CNTs and silver or gold nanoparticles could be applied by inkjet printing to flexible substrates, and the resulting applied material was at least 1 order of magnitude more conductive than a material made by printing functionalized CNTs alone.

Thus, in another embodiment, the conductive ink comprises a mixture of functionalized carbon nanotubes and metal nanoparticles.

In another embodiment, the conductive ink comprises a mixture of functionalized carbon nanotubes, metal nanoparticles, ionic liquids, or anti-agglomeration agents and mixtures thereof.

In another embodiment, the conductive ink comprises a mixture of graphene and metal nanoparticles.

Another embodiment provides a material comprising: a substrate coated with an adherent conductive material produced by a process comprising: (a) applying a conductive ink with a printer in single or multiple passes onto the substrate; wherein the conductive ink comprises an electrical conductor selected from the group consisting of: carbon nanotubes, graphene, a polycyclic aromatic hydrocarbon, metal nanoparticles, an inherently conductive polymer (ICP), ionic liquid, and combinations thereof; and (b) drying the conductive ink on the substrate to form the adherent conductive material on the substrate. Preferably the adherent conductive material has a surface resistivity of less than 100 Ohms/square.

Sintering the conductive ink after drying it on the substrate was found to form an adherent conductive material with lower resistivity in many cases than the material before sintering.

Thus, another embodiment provides a method of forming a conductive material comprising: (a) applying a conductive ink with a printer in single or multiple passes onto a substrate; wherein the conductive ink comprises an electrical conductor selected from the group consisting of: carbon nanotubes, graphene, a polycyclic aromatic hydrocarbon, metal nanoparticles, and an inherently conductive polymer (ICP), ionic liquid, and combinations thereof; (b) drying the conductive ink on the substrate to form an adherent conductive material on the substrate; and (c) sintering the adherent conductive material on the substrate at a temperature of 130-170° C. to form a sintered adherent conductive material. Preferably the sintered adherent conductive material has a surface resistivity of less than 10 Ohms/square.

Another embodiment provides a material comprising: a substrate coated with an adherent conductive material produced by a process comprising: (a) applying a conductive ink with a printer in single or multiple passes onto a substrate; wherein the conductive ink comprises an electrical conductor selected from the group consisting of: carbon nanotubes, graphene, a polycyclic aromatic hydrocarbon, metal nanoparticles, an inherently conductive polymer (ICP), ionic liquid, and combinations thereof; (b) drying the conductive ink on the substrate to form an adherent conductive material on the substrate; and (c) sintering the adherent conductive material on the substrate at a temperature of 130-170° C. to form a sintered adherent conductive material.

It is found that the materials can be used as part of a system which is excellent at repelling dust. This is useful in many applications, including spacecraft, windows, and photovoltaic cells. Thus, another embodiment provides an apparatus comprising a surface-cleaning coating; wherein the coating comprises a conductive material selected from the group consisting of carbon nanotubes, metal nanoparticles, graphene, an inherently conductive polymer (ICP), ionic liquid, and a combination thereof; wherein the coating is adapted to receive a voltage and upon application of the voltage to repel dust from the apparatus or a component of the apparatus.

Another embodiment provides a method of forming a surface cleaning coating comprising: applying a conductive ink with a printer in multiple passes onto a substrate; wherein the conductive ink comprises an electrical conductor selected from the group consisting of: carbon nanotubes, metal nanoparticles, graphene, a polycyclic aromatic hydrocarbon, an inherently conductive polymer (ICP), ionic liquid, and combinations thereof; and drying the conductive ink on the substrate to form an adherent conductive material on the substrate; wherein the substrate is a surface of an apparatus or of a component of an apparatus and the adherent conductive material is adapted to repel dust from the apparatus or a component of the apparatus.

Another discovery was that a composite material comprising a mixture of CNTs and silver or gold nanoparticles could be applied by inkjet printing to flexible substrates, dried, and sintered at temperatures between 130-170° C., and the resulting applied material was at least three times more conductive than a material made by printing CNTs alone.

Another discovery was that a composite material comprising a mixture of functionalized CNTs and silver or gold nanoparticles could be applied by inkjet printing to flexible substrates, dried, and sintered at temperatures between 130-170° C., and the resulting applied material was at least five times more conductive than a material made by printing functionalized CNTs alone.

The methods of the present invention are also useful to apply a conductive detection layer to the exterior of wires in order to detect damage to the wire before the wire completely breaks. This is described in U.S. Patent Application Publication No. US 2011/0210749 dated Sep. 1, 2011, the contents of which are incorporated herein by reference.

Thus, another embodiment provides a wire comprising: (a) a core conductor; surrounded by (b) an insulator; the insulator coated with (c) an adherent conductive material layer; the adherent conductive material layer covered with (d) an outer insulator; wherein the adherent conductive material layer is formed by a process comprising: (1) applying a conductive ink with a printer in single or multiple passes onto the substrate; wherein the conductive ink comprises an electrical conductor selected from the group consisting of: carbon nanotubes, graphene, a polycyclic aromatic hydrocarbon, metal nanoparticles, an inherently conductive polymer (ICP), ionic liquid, and combinations thereof; and (2) drying the conductive ink on the substrate to form the adherent conductive material on the substrate.

Another embodiment provides a wire comprising: (a) a core conductor; surrounded by (b) an insulator; the insulator coated with (c) an adherent conductive material layer; the adherent conductive material layer covered with (d) an outer insulator; wherein the adherent conductive material layer is formed by a process comprising: (1) applying a conductive ink with a printer in single or multiple passes onto the substrate; wherein the conductive ink comprises an electrical conductor selected from the group consisting of: carbon nanotubes, graphene, a polycyclic aromatic hydrocarbon, metal nanoparticles, an inherently conductive polymer (ICP), ionic liquid, and combinations thereof; and (2) drying the conductive ink on the substrate to form the adherent conductive material on the substrate; and (3) sintering the adherent conductive material on the substrate at a temperature of 130-170° C. to form a sintered adherent conductive material.

Another embodiment provides a method of producing a wire comprising a damage detection layer, the method comprising: obtaining a wire comprising a core conductor surrounded by an insulator; and applying a conductive ink with a printer in single or multiple passes onto the insulator; wherein the conductive ink comprises an electrical conductor selected from the group consisting of: carbon nanotubes, graphene, a polycyclic aromatic hydrocarbon, metal nanoparticles, an inherently conductive polymer (ICP), ionic liquid, and combinations thereof; and drying the conductive ink on the substrate to form the adherent conductive material on the insulator; wherein the adherent conductive material is adapted to be used in detecting damage to the wire. Preferably the method further comprises applying an insulator material over the adherent conductive material to form an outer insulator layer over the adherent conductive material.

Another embodiment provides a damage detection system for surfaces comprising: (a) a substrate, preferably an insulator; coated with (b) an adherent conductive material layer; the adherent conductive material layer covered with (c) an outer insulator; connected to (d) detection circuitry. The adherent conductive material layer may be formed by any of the methods described herein.

Multiple layers of adherent conductive material can be incorporated into an apparatus and connected to damage detection circuitry to provide three dimensions of damage detection.

DETAILED DESCRIPTION OF THE INVENTION

The embodiments of the invention generally involve a method of forming a conductive material comprising using a printer to apply one or more species of electrical conductors in a conductive ink to a substrate; and drying the conductive ink on the substrate to form an adherent conductive material on the substrate.

In some embodiments, the adherent conductive material in a further step is sintered, preferably at a temperature of 130-170° C.

The term "conductive ink" as used herein refers to a liquid solution or suspension comprising electrical conductors. It is not necessarily opaque and may dry to leave an opaque, translucent, or transparent material. The conductive ink could be in powder form to be added to a specified solution.

Figure 11:
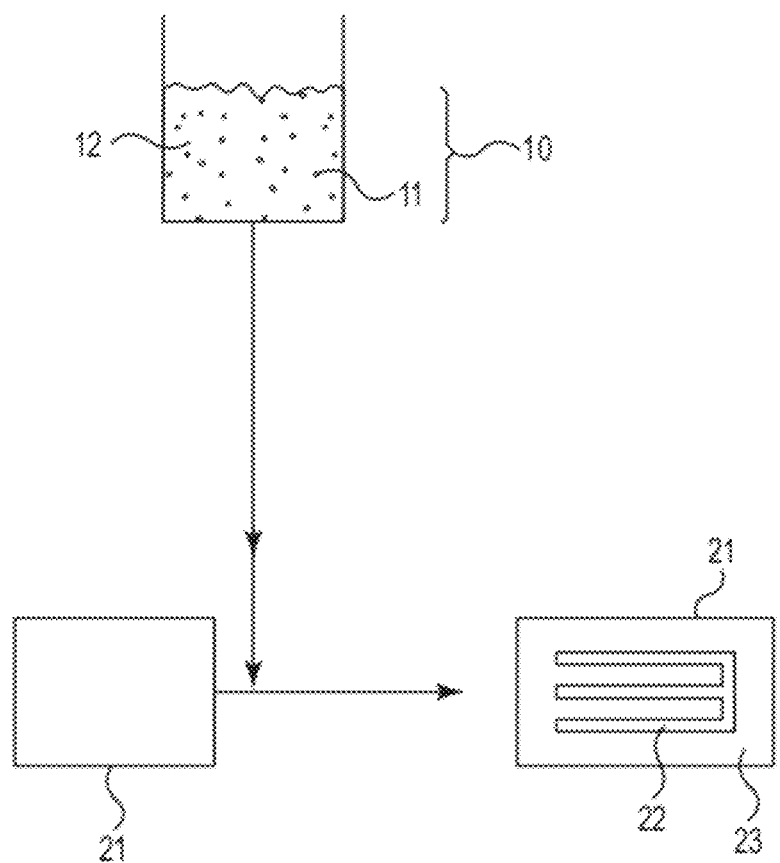
FIG. 11 is a schematic drawing of a process of the invention for forming a conductive material on a substrate involving applying a conductive ink with a printer.

FIG. 11 is a schematic drawing of the process. A conductive ink 10 comprises an electrical conductor 11, preferably in an aqueous solvent 12. The conductive ink 10 is applied by a printer to a substrate 21. The conductive ink is then dried on the substrate to produce an electrically conductive material 22 on the substrate 21. The electrically conductive material 22 may be printed in a pattern as shown in FIG. 11, or may completely coat the substrate 21. In FIG. 11, uncoated areas 23 of the substrate 21 that do not have the electrically conductive material 22 are shown.

The adherent conductive material is ordinarily left in place on the substrate. But in some embodiments it could be removed from the substrate (i.e., peeled off the substrate or etched) and used separately from the substrate.

The electrical conductor in specific embodiments is or comprises carbon nanotubes. The carbon nanotubes (CNTs) may be single-wall, double-wall, or multi-wall CNTs. The term "carbon nanotubes" as used herein includes coated and uncoated CNTs. It also includes functionalized CNTs, e.g., CNTs functionalized with carboxylic acid, sulfonic acid, or hydroxyl groups. Also, the CNTs may be metal-coated CNTs, e.g., copper-coated CNTs.

In other embodiments, the electrical conductor is or includes polycyclic aromatic hydrocarbons, which includes pentacene, and bisperipentacene. These are related in structure to graphene.

In other embodiments, the electrical conductor is or includes metal nanoparticles or an inherently conductive polymer (ICP).

In specific embodiments, the conductor is carbon nanotubes, an ICP, metal nanoparticles, or a combination thereof. In other embodiments, it is carbon nanotubes or metal nanoparticles or a combination thereof. The carbon nanotubes may be functionalized or metal coated.

The metal nanoparticles may be, e.g., silver, gold, copper, or nickel nanoparticles.

The ICP, in specific embodiments, is a polyaniline or polythiophene. In specific embodiments, the ICP is not PEDOT.

Preferably the conductive ink comprises the electrical conductor dissolved or suspended in a polar solvent. The polar solvent may be an aqueous solvent, i.e., primarily comprising water. In other embodiments, the polar solvent comprises a polar organic solvent, for example, a C1-C3 alcohol. In other embodiments the polar solvent may be DMF, DMAc, NMP, chlorobenzene, trichlorobenzene, trichloroethylene, or ethyleneglycol.

In other embodiments, the electrical conductor may be dissolved or suspended in an apolar organic solvent. Graphene and polycyclic aromatic hydrocarbons, in particular, may be dissolved or suspended in an apolar organic solvent.

In a preferred embodiment, the printer is an inkjet printer. In a more specific embodiment, it is a piezoelectric inkjet printer. In alternative embodiments, the printer may be a bubble jet printer, a screen printer, or an electrohydrodynamic printer.

With uncoated single-walled carbon nanotubes applied by inkjet printing in multiple passes applied to a magnetic substrate, the inventors were able to produce a conductive material with surface resistivity of less than 100 Ohms/square. (Example 1) The inventors have also shown that metal-coated nanotubes generally have less resistance than uncoated nanotubes, and mixing metal nanoparticles and/or ICPs with the CNTs can also reduce the resistance. Thus, in some embodiments, the conductive material formed has a surface resistivity of less than 100 Ohms/square, less than 1000 Ohms/square, 1-100 Ohms/square, 0.1-100 Ohms/square, 10-100 Ohms/square, 10-200 Ohms/square, or 10-1000 Ohms/square.

It was found that applying the conductive ink in multiple passes produces an adherent conductive material with lower resistance than applying in a single pass. In general, the greater the number of passes, the thicker the material becomes and the lower its resistance. In specific embodiments, the conductive ink is applied in at least 10 passes.

The substrate for the adherent conductive material may be any suitable rigid or flexible substrate. In particular embodiments, it is a fabric or a paper. In particular embodiments, it is a polymer substrate. Preferably it is a hydrophilic polymer substrate, such as a coated polyolefin and polyimides. In some cases, better conductivity was obtained with printing onto coated transparencies than uncoated transparencies. Commercial polymer films can be coated with proprietary coatings that make the surface more hydrophilic. We have also obtained acceptable results with some coated and uncoated polyimide, KAPTON®, and polyethyleneterphthalate (PET) substrates, although these are relatively hydrophobic. Uncoated and coated transparency films were used in the experiments below. In particular embodiments, the substrate is the insulation layer of a wire. In these examples, the conductive material may form an electrically conductive damage detection layer, as described in U.S. Patent Application Publication No. US 2011/0210749.

Thus, in some embodiments, the substrate is a polymer. In some embodiments, the polymer is a hydrophilic polymer or a hydrophobic polymer. More preferably, it is a hydrophilic polymer. It may be a surface-treated polymer, where the surface treatment makes the substrate more hydrophilic. Surface treatments may be coating, plasma etching, or chemical etching.

In another embodiment, the adherent conductive material comprises a plurality of layers, wherein at least one pair of adjacent layers comprises different electrical conductors. Each layer is formed by applying a conductive ink in at least one pass, wherein at least two adjoining layers comprise different electrical conductors. It is thought that alternating layers of different conductors (e.g., different ICPs, or an ICP and an ICP/metal combination, or CNTs and ICPs, or ICP/metal combination) improves conductivity of the material by providing improved electrical pathways through alignment and band gap optimization. In this case, it is advisable to have the coefficient of thermal expansion of adjacent layers be similar to prevent interlayer delamination when temperature changes occur, or even with initial cooling of the material after it is formed.

In one embodiment of adjacent layers with different conductors, one layer comprises CNTs without an ICP, and an adjacent layer comprises an ICP.

It was found that magnetization could increase the conductivity of the material formed. It is proposed this is because the magnetic field aligns the conductors. It was shown that both applying CNTs to magnetic sheets or applying CNTs to sheets with external magnets, improved conductivity dramatically, but using both techniques together did not work better than either alone, which we suggest was due to the improper alignment of the two magnetic sources.

Thus, in one embodiment, the electrical conductors are applied to a magnetic substrate, i.e., the substrate is magnetized before the applying step. In another embodiment, a magnetic field is applied to the conductive ink during the applying step.

It was found that including a detergent, ionic liquid, or anti-agglomeration agent in the conductive ink to improve dispersion of CNT conductors improved conductivity of the material formed. Thus, in one embodiment, the conductive ink comprises CNTs and a detergent in aqueous solution or suspension.

In a particular embodiment, the conductive ink comprises a mixture of CNTs and metal nanoparticles.

Figure 12:
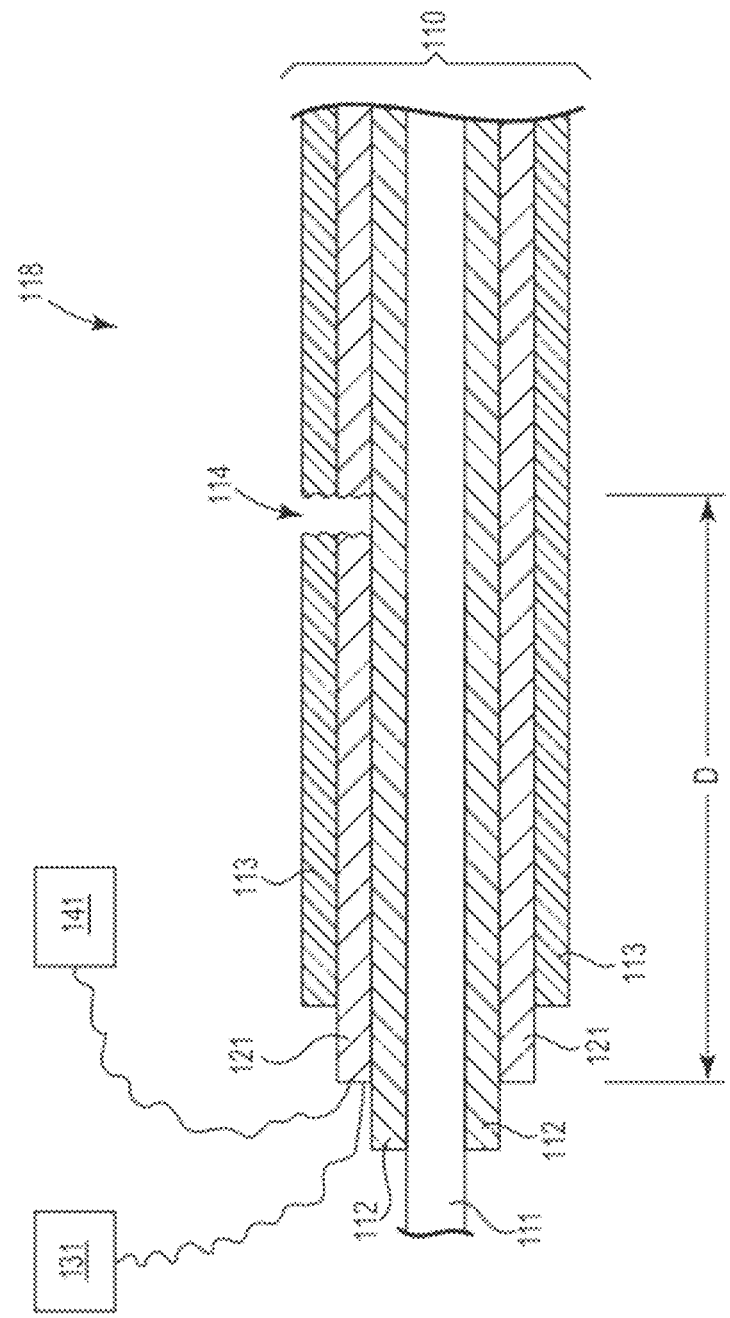
FIG. 12 is a schematic drawing of a damage detection system comprising an electrically conductive wire with an outer conductive detection layer composed of an electrically conductive material of the present invention. The system also includes an electrical signal generator adapted to deliver electrical signals to the detection layer, and a detector circuit adapted to detect the electrical signals in the detection layer and process information about the detected signals to identify flaws in at least one layer of the system.

FIG. 12 shows an electrical wire with a printed layer of electrically conductive material as a damage detection layer around the wire. The wire 110 includes an electrically conductive wire core 111, which is for carrying the operating energy of the wire. The wire core 111 is surrounded by a layer 112 of an electrically insulative material. Covering the insulative layer 112 is an electrically conductive material layer 121. Preferably surrounding the electrically conductive material layer is another electrically insulative material layer 113. The electrically conductive material layer 121 may be applied as described herein by printing, preferably by inkjet printing.

FIG. 12 shows the wire 110 as a part of a damage detection system. The damage detection system 118 includes an electrical signal generator 131 adapted to deliver one or more electrical signals to the detection layer 121 of electrically conducting material. A detector circuit 141 is also electrically linked to the electrically conductive detection layer 121 and adapted to detect electrical signals in layer 121.

FIG. 12 also shows a break 114 in the outer insulation layer 113 and the detection layer 121. The presence or absence of damage to the detection layer 121, particularly a complete or partial break 114 in the detection layer 121 as shown, can be detected by resistance measurements or time domain reflectometry. In this technique, electrical signals are transmitted through the detection layer 121 from one end of the wire, and reflected signals are detected. From the time of return of the reflected signals, it can be determined whether there is damage in the wire. This is described in more detail in U.S. Patent Application Publication No. US 2011/0210749. It can also be detected by resistance methods or other reflectometry methods, such as standing wave reflectometry and frequency domain reflectometry.

Embodiments of the invention will now be illustrated by the following examples, which are intended to illustrate certain embodiments of the invention without limiting the scope thereof.

EXAMPLES

Example 1

Inkjet Printing of Conductive Ink Containing Carbon Nanotubes.

The feasibility of printing conductive inks was investigated for integration as the damage detection layer in an in-situ wire damage detection system. Inkjet printing is a common commercial process used in every wire construction. Manufacturers are required by law to print the wire type, gauge, and safety information on the exterior of each foot of manufactured wire. It was hypothesized that this methodology could be used to impart a printed conductive layer onto the wire insulation. To accomplish this, a conductive ink would need to be deposited using a method similar to the commercial wire printing technology.

The printing method was also examined as a possible means to improving the conductivity of the detection layer. Various commercial off-the-shelf (COTS) printing methods, such as thermal and piezoelectric inkjet printing, screen printing, and bubble jet printing, were examined as different methods for ink delivery. Each method was determined to be a viable form of ink delivery, but the inkjet printing method closely resembled commercial delivery systems. Therefore, initial testing methods were focused on the inkjet delivery system using a commercial off-the-shelf printer.

Experimental

Conductive Ink Formulations

Figure 1:
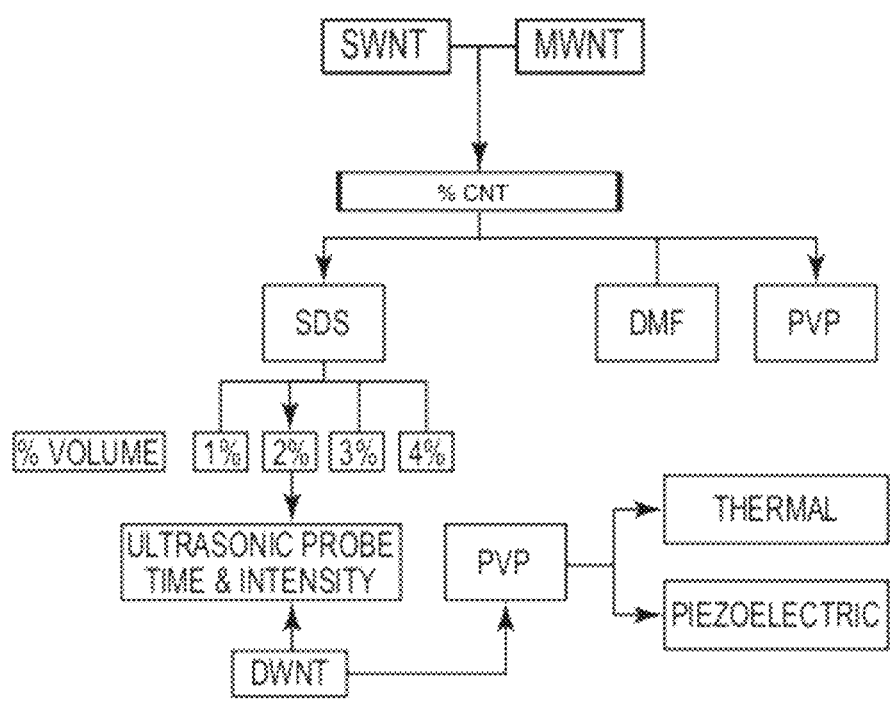
FIG. 1 is a flow chart of CNT ink formulations and printing methods.

FIG. 1 depicts the initial general approach for carbon nanotube ink formulations. Single-walled (SWNT) and multi-walled (MWNT) carbon nanotubes were dispersed into deionized water at various weight percents. Sodium 1-sulfonatooxydodecane (SDS), a surfactant, was added at various weight/volume percents to the solution to improve the dispersal and suspension of the CNTs in water. The mixture was then sonicated using a SONICS VCX-750 Ultrasonic probe. Sonication times and intensities were varied to improve CNT dispersion and improve print quality. In some cases, poly(1-vinyl-2-pyrrolidinone) (PVP) was added to help dispersion and viscosity conditions required for printing.

Inkjet Printing of CNT Inks

Four HP 950C printers were utilized for printing. Each printer was thoroughly cleaned and inspected for proper operation. Ink was drained from each cartridge using a COTS inkjet refill kit. The cartridges were washed with 1 L of deionized water to remove any residual ink. The black cartridges were filled with 45 mL of a conductive ink formulation, while the color cartridges were filled with approximately 5 mL of water. The purpose of the water was to fool the ink monitoring sensor from detecting an empty cartridge and prevent printing. Three 1-inch wide, 10-inch long strips were printed on various substrates, including papers, polymers, fabrics, magnets, and various combinations thereof. Pages were typically printed at 1, 5, 10, 15, and 20 passes. In some cases, printing was performed up to 120 passes. Multiple passes were required to impart additional ink to increase conductivity, since it was impossible to regulate the volume of ink flow for the COTS system. When necessary, electrical contact leads were applied to the conductive strips using silver paint.

Surface Resistivity Measurements

Most plastics are electronic insulators that have a surface resistivity higher than $10^{12}$ Ohms/square, in the range of $10^{14}$-$10^{18}$ Ohms/square, and will accumulate electrostatic charges. Materials with a surface resistivity lower than $10^{10}$ Ohms/square are considered as electrostatic dissipaters due to their ability to dissipate electrostatic charges. Surface resistivity is the measure of the flow resistance of an electric current flowing across a surface, the ratio of DC voltage drop per unit length to the surface current per width, and is independent of the size of the square or its dimensional units, whereas volume resistivity is the resistance to leakage current through the body of an insulating material. A Prostat 801 Surface and Volume Resistivity meter was employed to obtain surface and volume resistivity values on various conductive inks. A minimum of 5 measurements were obtained for each strip and then averaged to give a final result. A Lucas Labs 4-point probe meter was also used to measure electrical conductivity. The 4 leads on the probe eliminate contact resistance typically found between metal and non-metal connections.

CNT Inks Results

Substrates

Figure 2:
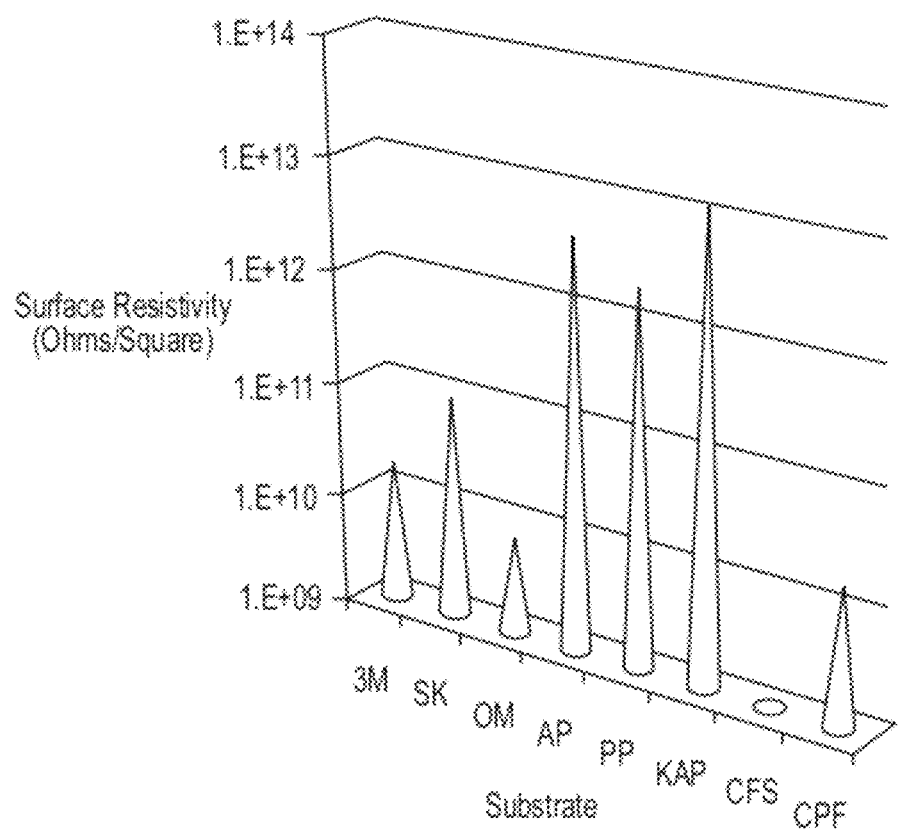
FIG. 2 shows substrate surface resistivity values (before application of a conductive ink). 3M, 3M® transparencies, 17.8 GOhms/square. SK, Skilcraft® transparencies, 91.4 GOhms/square. OM, OfficeMax® transparencies, 6.68 GOhms/square. AP, HP Advance Photo Paper, 4.49 TOhms/square. PP, HP Premium Photo Paper, 2.17 TOhms/square. KAP, KAPTON® 7 mm thick, 11.89 TOhms/square. CFS, June Tailor Colorfast Fabric Sheets, 359 MOhms/square. CPF, June Tailor Computer Printer Fabric, 16.84 GOhms/square.

In order to accurately measure the conductivity of the printed samples, the substrate conductivities were collected to baseline the analysis. FIG. 2 shows the average surface resistivity values for the candidate substrates materials. Two groups of candidate substrates were investigated: (1) Hygroscopic materials, such as paper and fabrics, were expected to yield larger conductivity changes due to the insulating property of the substrate and the material's ability to absorb and wick-away the solvent and (2) polymer samples, such as KAPTON® and PET transparencies, that closely resembled polymer insulating materials found in the exterior coating of wires. All baseline resistivity values ranged between $10^8$ and $10^{14}$ Ohms/square.

CNT Ink Formulations

Figure 3:
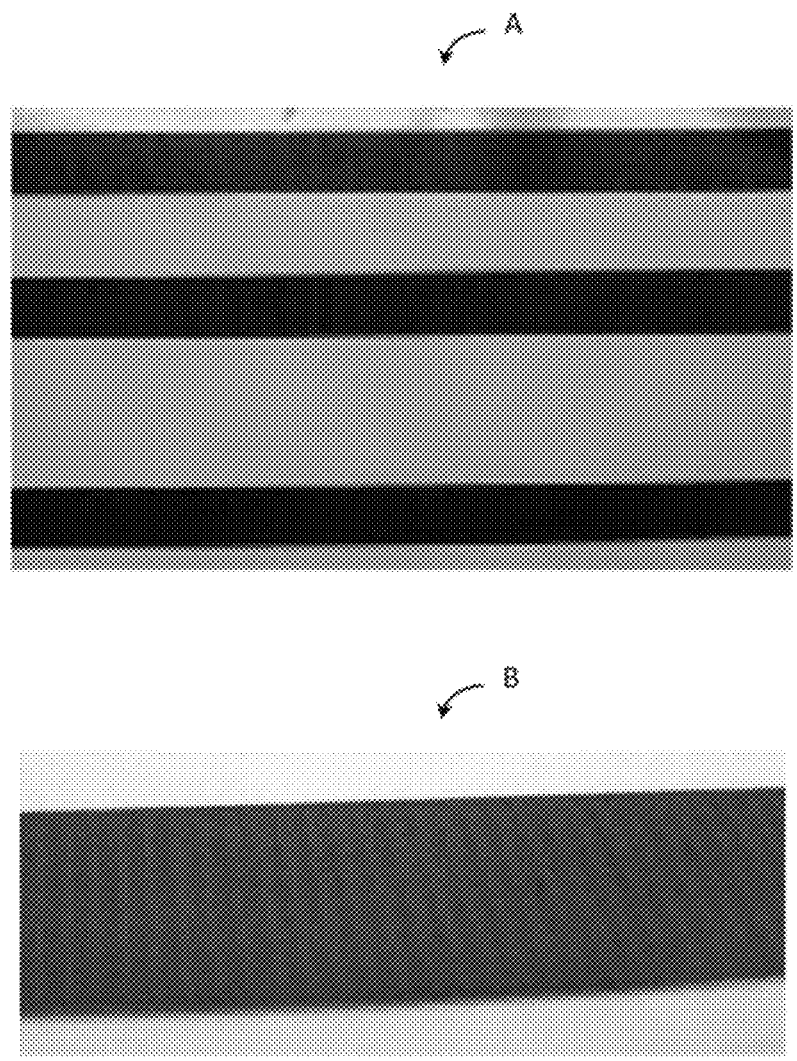
FIG. 3 is a photograph of typical CNT ink strips on a magnetic sheet (panel A). Panel B shows a closer image.

To maximize the conductivity of the printed ink, the concentration of SWNT and MWNT was controlled at intervals between 0 and 0.47 weight percent CNT in a 2 weight/volume percent SDS/water solution. Solutions were filtered with a standard coffee filter (~20 microns) and then printed at 3, 6, and 9 passes using the HP950C printer with 1-minute drying time at ambient conditions. An example of a typical 9-pass 3-strip print is show in FIG. 3.

In almost every case, the surface resistivity of the printed strip decreased with an increase in the number of passes. This can be explained on the basis that increasing the number of passes would increase the density of charge carriers per unit area. Increasing the weight percent SWNT in solution had the same affect up to 0.24 weight percent. Above 0.24 wt % SWNT and 0.5 wt % MWNT concentrations, aggregates clogged the print head during the first couple of passes preventing deposition.

The substrate also had a significant effect on the conductivity of the CNT prints. Printing on KAPTON® and non-coated PET substrates led to inconsistent depositions of the water-based inks. However, surface treated PET substrates, such as SKILCRAFT®, OFFICEMAX®, and 3M® transparency films, resulted in the highest conductivity improvement. The difference in observed resistance between different transparency vendors was suspected to be caused from the affect of the surface treatment on the alignment of the CNTs. Based on these results, surface treatment of polyimide or TEFLON® wire insulation would possibly be necessary for successful integration of this technology as a damage detection layer on the exterior of a wire.

Figure 4:
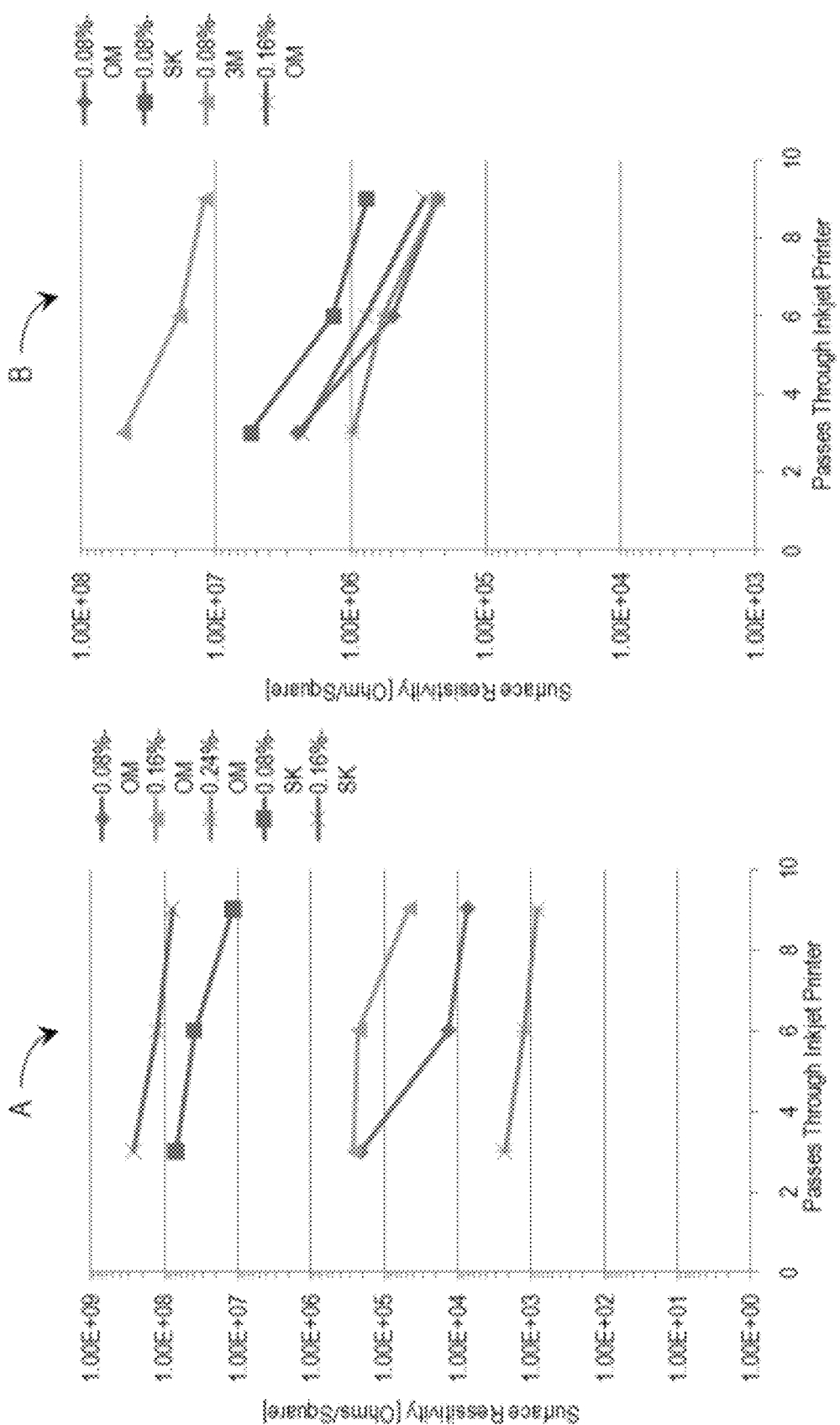
FIG. 4 shows the surface resistivity of strips of CNT printed on various substrates. The substrate abbreviations are those used in FIG. 2. In panel A the electronic conductor in the conductive ink was single-wall CNTs. In panel B it was multi-wall CNTs. The percent shown is the weight percent of CNTs in the ink.

In addition, FIG. 4 shows a difference in resistance between SWNT and MWNT under identical conditions. Printed MWNT strip resistivities were typically between $10^4$ and $10^7$ Ohms/square with a small improvement in conductivity at higher concentrations; however, with SWNT, there was an observed continual decrease in resistivity over the gradual increase in CNT concentration. This was due to the ability of SWNT to disperse better than MWNT in the solution mixture. Therefore, dispersion methods were examined with SWNT to determine the effectiveness of the surfactant and sonication on the conductivity of the printed strips.

Figure 5:
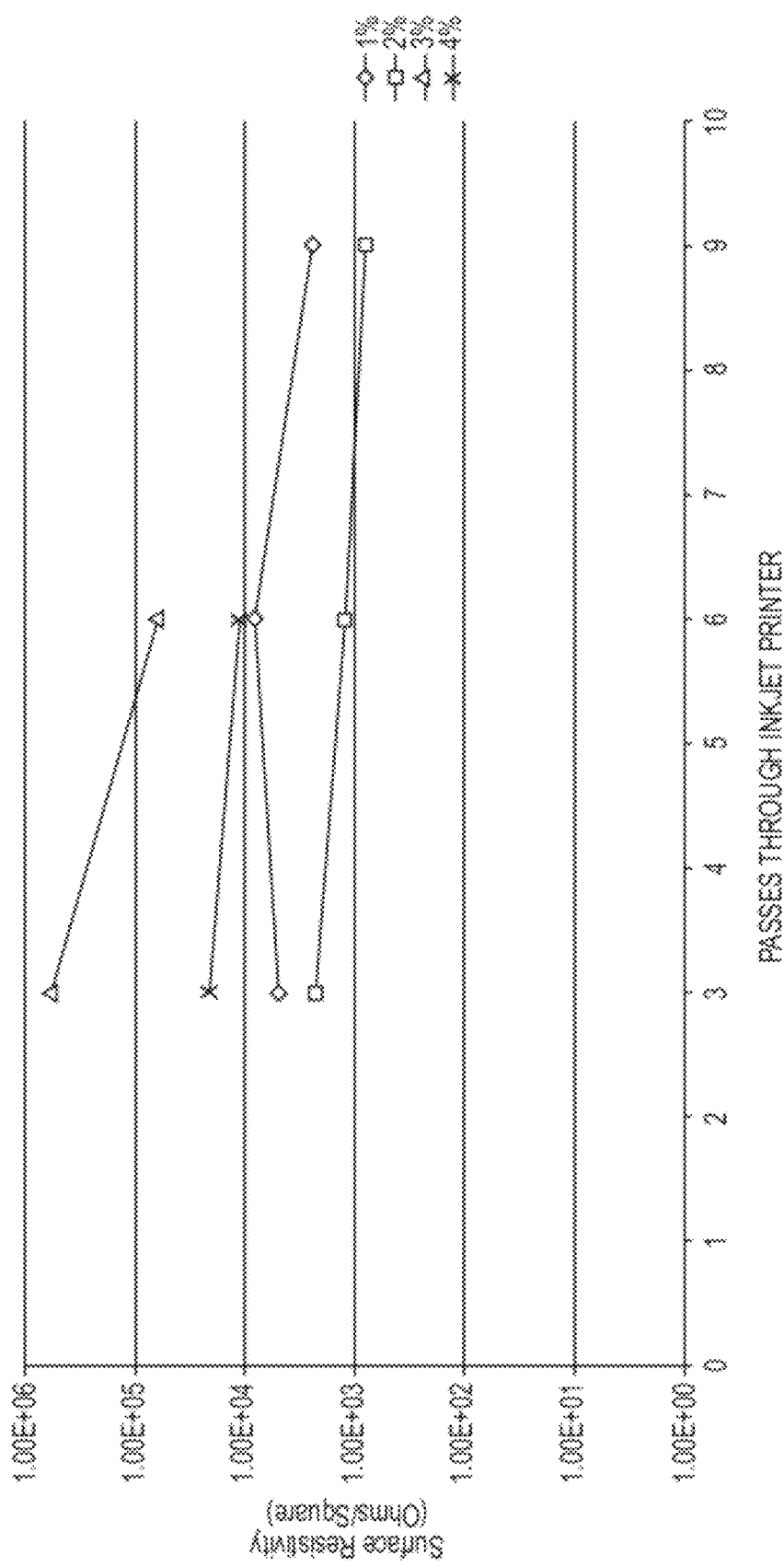
FIG. 5 shows the effect of sodium dodecylsulfate (SDS) concentration on the surface resistivity of printed 0.24 wt % single-wall CNTs in water applied with 3 to 9 passes.
Figure 6:
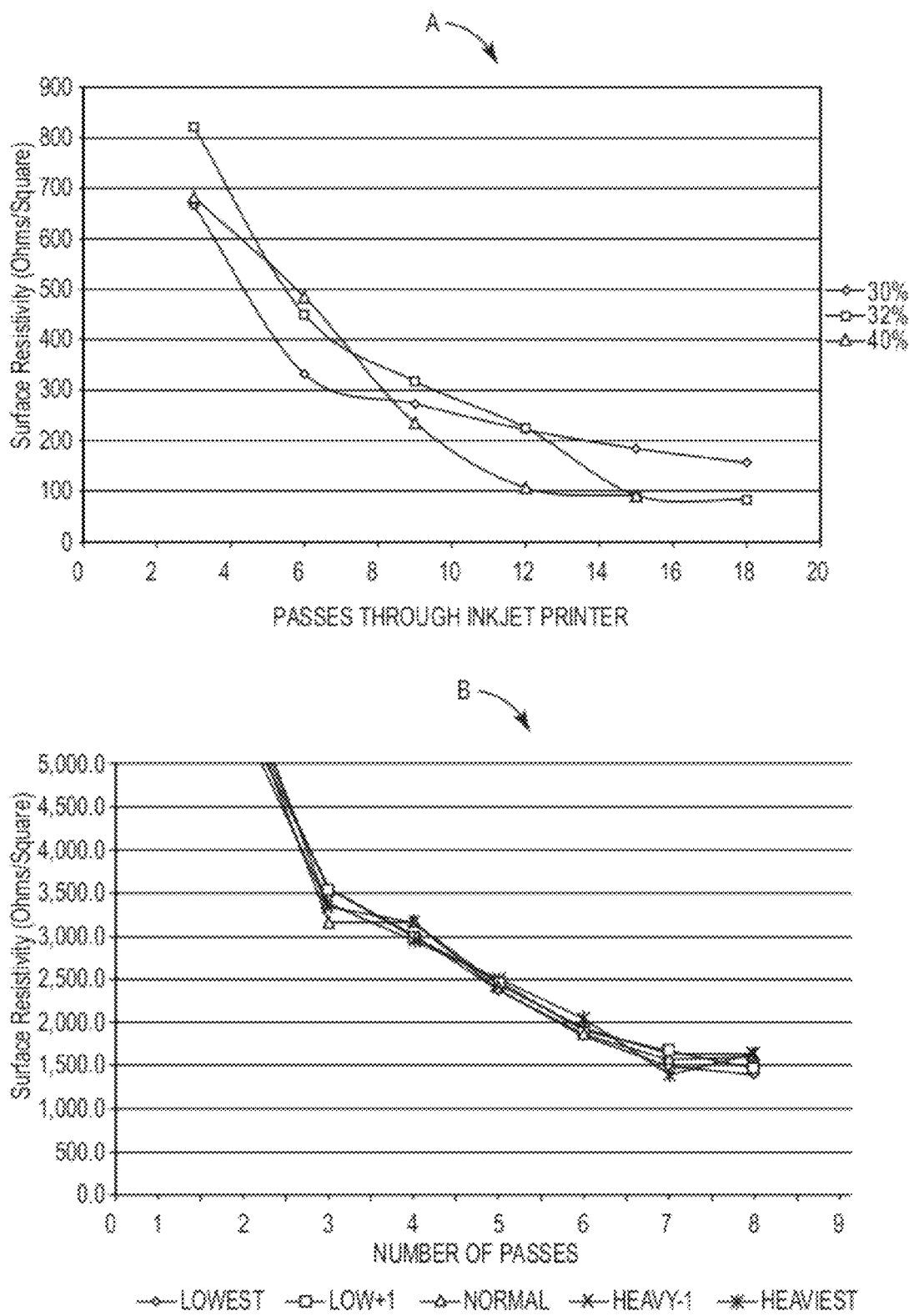
FIG. 6 shows the effect of sonication intensity (panel A) and ink volume setting (panel B) on the surface resistivity of 0.24 wt % single-wall CNT-2% SDS-water ink solution for 1 hour on magnetic paper and transparency.

In most literature reports, CNT ink formulations required a surfactant or ultrasonic treatments to disperse CNTs in water. The concentration of surfactant was first examined to improve CNT concentration. The affect of increasing SDS concentration on the conductivity of 0.24 wt % SWNT in water was examined based on the number of printing passes (FIG. 5). From this data, the optimum amount of SDS required to effectively disperse the SWNT into water was 2 weight/volume percent. The sonication techniques used to break up the aggregates to prevent print head clogging and improve substrate deposition were examined. Several reports mentioned that increasing the intensity and duration of sonication would break the CNTs, thereby reducing conductivity of the printed ink. To evaluate this, a 0.24 wt % SWNT-2% SDS-water solution was sonicated under 3 intensities: 30, 32, and 40% (FIG. 6A). In addition, inks were sonicated under the 5 different settings at 40% amplitude for 1 hour. The resistivity of the printed strips at each of the 3 intensities and 5 settings was measured to determine if the intensity affected the print quality and resistance. The effect of printer ink volume was also investigated to determine if increasing the ink volume reduced the surface resistivity of the printed traces (FIG. 6B). As shown in FIGS. 6A and 6B, there was no observable affect in resistivity measurements from the sonication intensity or printer ink volume settings.

Another approach that was attempted to address dispersion and increase ink conductivity was to add dimethylformamide (DMF) to the solution. DMF is a solvent known to improve dispersion of CNTs. As described in literature, the DMF visually improved the dispersion of the CNTs in water; however, we have found that including DMF increased the resistivity of the printed strips (results not shown). This was believed to be a result from the incorporation of the non-conductive DMF into the CNT.

Figure 7:
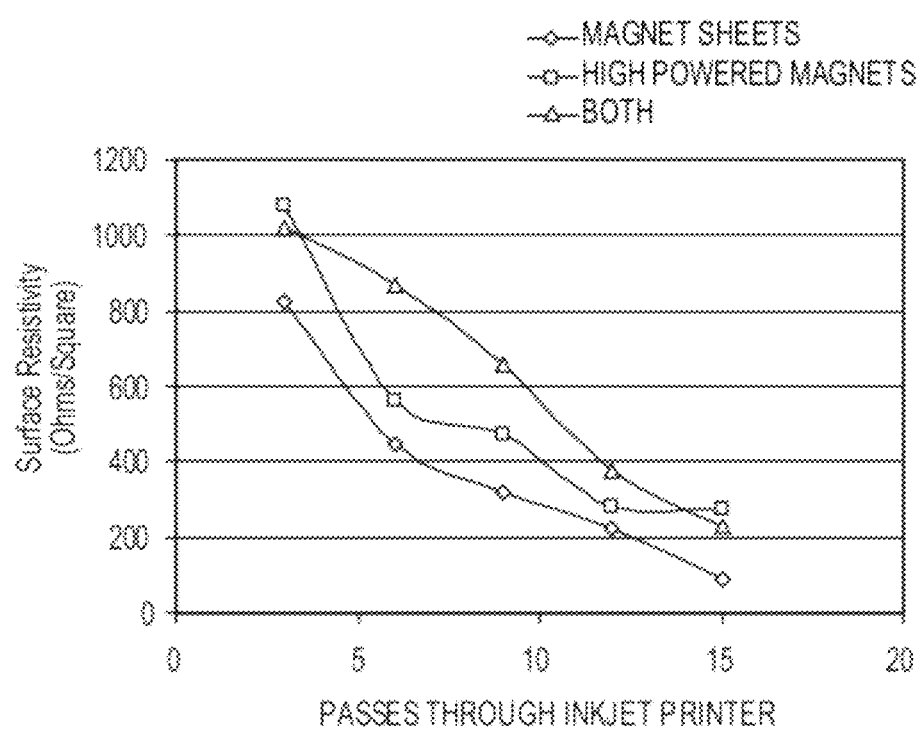
FIG. 7 shows the effect of printing on magnetic sheets, high-powered magnets, or both on the surface resistivity of inkjet-printed lines made from a solution containing 0.24 wt % single-wall CNTs in 2% SDS/Water at 32% ultrasonic intensity.

Through the optimization of substrate, formulation, and processing conditions for the cartridge, resistance values for the SWNT printed inks were less than 1 kOhm over 10 inches in length. However, for infusion as a detection layer into the damage detection system, the resistivity of printed surfaces needed to be less than 50 Ohms/square. We attempted to use magnetic fields to align the CNTs and thereby improve conductivity. For our experiments, we incorporated off-the-shelf magnetic sheets and magnets into the printing process. Data shown in FIG. 7 show the decrease in electrical resistivity of the CNT printed strips using the magnetic tools. The combination of the tools was not as effective as the individual tool, which we suggest was due to the improper alignment of the two magnetic sources. The incorporation of the magnetic sheets into the printing process led to measure resistivity values less than 100 Ohms/square.

CNT Ink Printing Methods

The HP950C printer was chosen for these experiments based on several factors. The key factor was its ability for high-throughput testing made possible due to the availability of refillable ink cartridges. The standard cartridges could be refilled manually or empty cartridges could be purchased inexpensively via retail stores such as CARTRIDGE WORLD or CARTRIDGE SOURCE OF AMERICA. Disposable cartridges could be refurbished or discarded if the print head was damaged or clogged. When print heads of single print head printers (e.g. CANNON and EPSON) fail, then the entire printer must be replaced. HP inkjet cartridges were designed for water-soluble ink formulations. The use of water rather than a harsh solvent or alcohol was a safety advantage. Water was compatible with a larger variety of candidate substrate materials. The piezoelectric printing method was also advantageous since heat was not introduced into the ink systems. Although thermal and bubble jet printers were tested using our optimized ink formulations, these did not work as well to produce quality printed strips. Some alternative printer cartridges contained foam to prevent print heads from clogging, but the foam led to clogging and contamination.

CONCLUSIONS

From our testing, CNT ink formulations were synthesized containing various weight percentages of CNTs and surfactants. Sonication times and intensities did not affect the print quality or conductivity of the inks Some dispersant agents, such as DMF, had undesirable effects on the conductivity. Substrate compatibility, especially in the form of magnetic sheets, had a substantially positive effect on the conductivity of the printed strips. An optimized formulation was achieved containing 0.24 wt % SWNT and 2% SDS in water printed onto a PET substrate with a magnetic sheet. This formulation when printed in a standard inkjet printer resulted in resistivity values less than 100 Ohms/square. This is a significant achievement compared to literature reported resistivity values.

Example 2

Printed CNT Electrically Conductive Material Layer as a Dust Screen

Methods:

Conductive inks were printed onto various substrates as described in Example 1.

Figure 8:
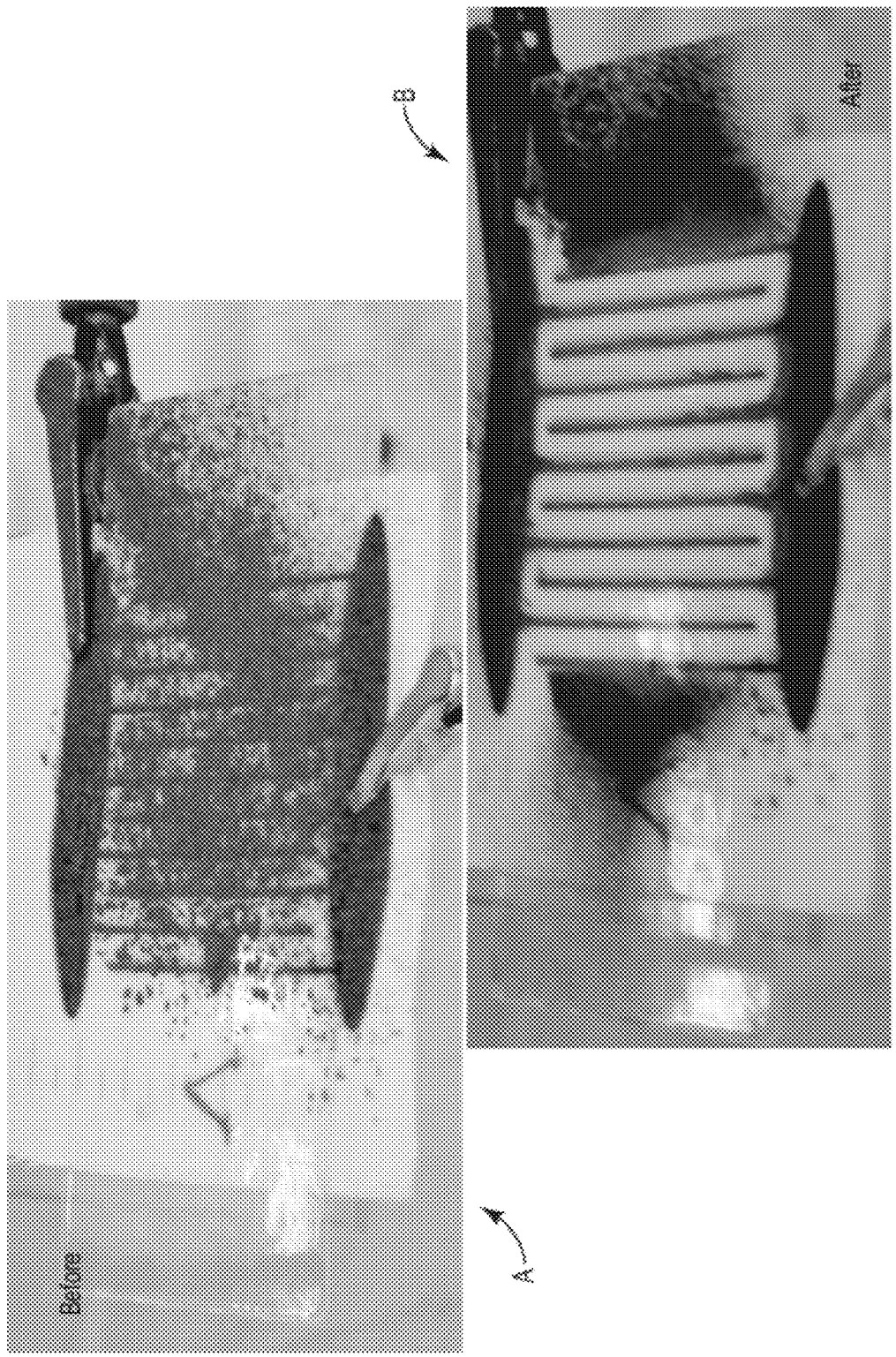
FIG. 8 shows CNT-containing conductive ink applied to a cotton substrate sheet in a pattern of lines before and after the application of power. Panel A shows the sheet before application of high voltage to the conductive ink. Panel B shows the sheet after application of high voltage, and shows that dust was repelled.

Results:

In FIG. 8 CNT conductive material was applied to a cotton substrate with an inkjet printer in a pattern of lines. The sheet was then laminated with polyethyleneterphthalate (PET) to protect the conductive ink. The dark areas in panel B are the areas with conductive material applied. The white areas did not have conductive ink applied. Dust was applied to the sheet in panel A. A voltage was then applied to the sheets. Panel B shows the same sheet after application of the voltage. Dust was repelled from the entire surface area containing the printed electronics.

Figure 9:
FIG. 9 shows a similar experiment to FIG. 8, on a larger area.
Figure 9:
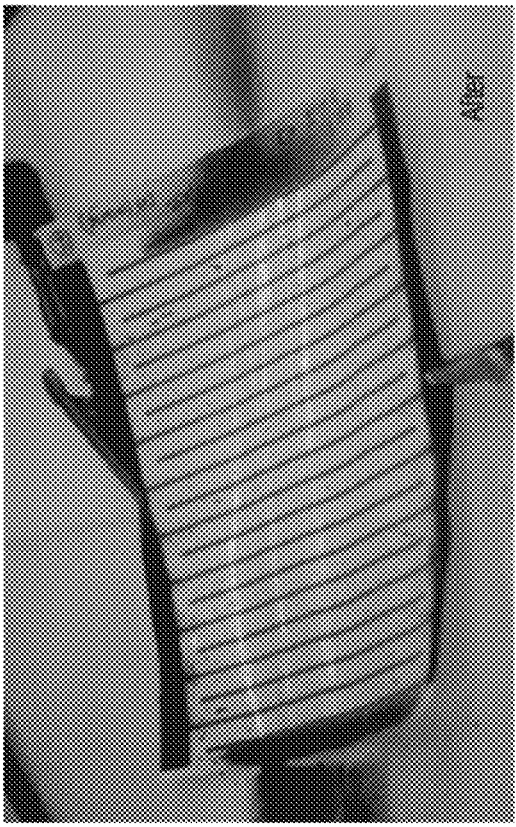

FIG. 9 shows the same result when the CNT conductive material was printed onto a larger cotton substrate with a different conductive pattern.

Figure 10:
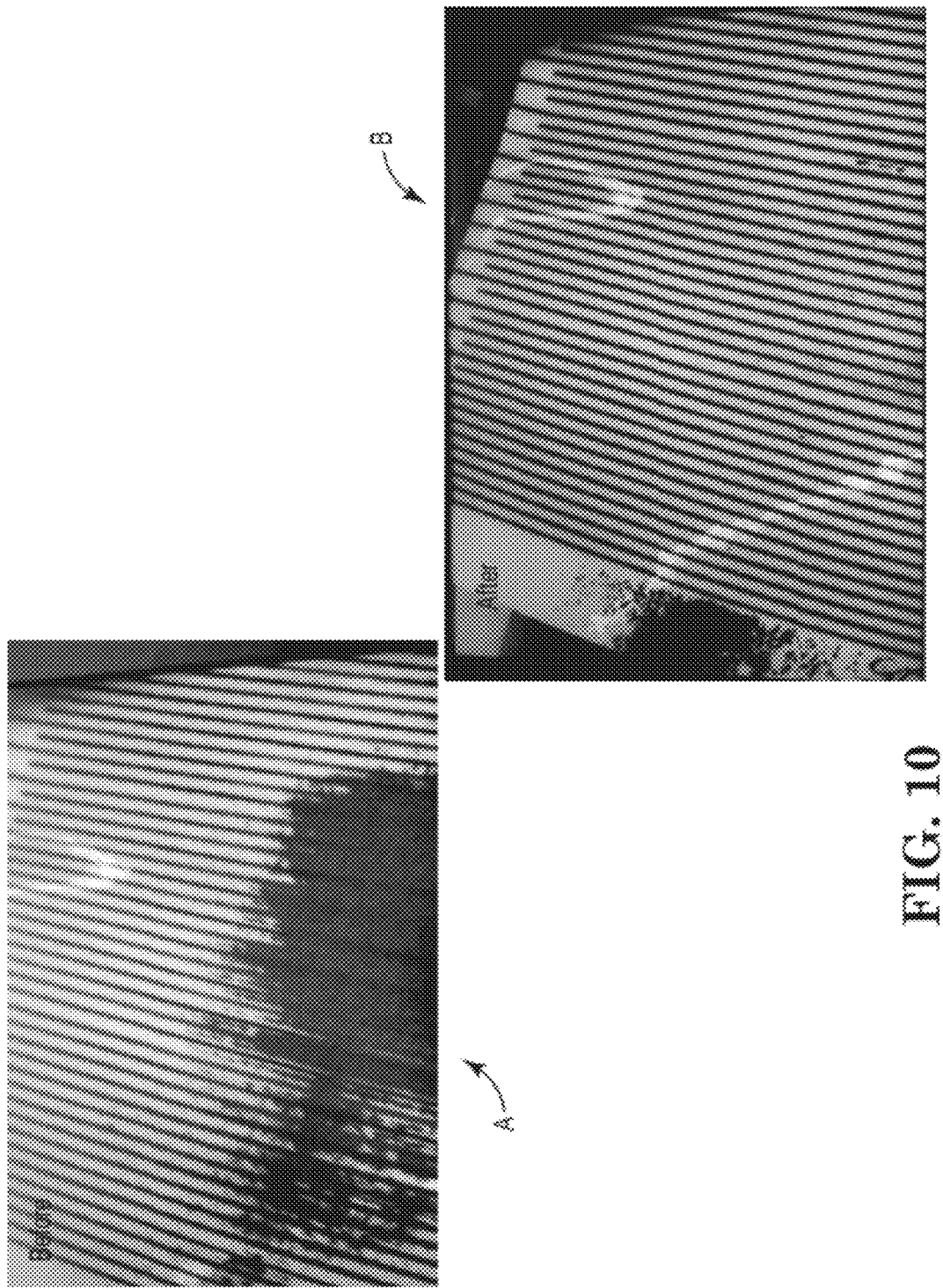
FIG. 10 shows a similar experiment to FIG. 8 with the sheet in a vacuum chamber.

FIG. 10 shows the results when the cotton substrate was placed in a vacuum chamber before and after an applied voltage to show dust removal of the printed CNT ink pattern.

Example 3

Conductive Ink Formulation 1

Ink Formulation 1.81 g single-wall carbon nanotubes, 0.30 g sodium dodecyl sulfate, and 40.0 g deionized water were placed in a container and the mixture was agitated for 30 seconds by shaking. The dark suspension was mixed using a SONICS VCX-750 ultrasonic probe for 60 minutes at 32% amplitude. Care was taken to ensure that only ~¼ inch of the probe tip was below the surface of the liquid during the sonication process. An additional 2.0 ml of deionized water was added and the dark suspension was mixed using an ultrasonic probe for another 60 minutes (32% amplitude). The suspension was very viscous and difficult to work with. The suspension was transferred to a large container and diluted with several 40.0 ml portions of deionized water to provide a printable conductive ink.

Processing and Evaluation

The printed conductive ink test specimen was allowed to dry at room temperature and humidity (20° C., 50% R.H.) until no liquid was visible. After drying, the surface resistivity was measured using a Lucas Labs 4-point probe. At least 27 data points were collected for the test specimen. The average surface resistivity for the sintered test specimen was 400 Ohms/square.

Example 4

Conductive Ink Formulation 2
Ink Formulation 0.12 g multi-wall carbon nanotubes, 1.00 g sodium dodecyl sulfate, and 49.0 g deionized water were placed in a container and the mixture was agitated for 30 seconds by shaking. The container was placed in an ice bath and the dark suspension was mixed using a SONICS VCX-750 ultrasonic probe for 60 minutes at 32% amplitude. Care was taken to ensure that only ~¼ inch of the probe tip was below the surface of the liquid during the sonication process. The sonication process was performed 3 times, providing a total of 180 minutes of mixing. Ice was added to the ice bath as necessary to keep the container full. The dark suspension was capped and stored for printing.

Processing and Evaluation

The printed conductive ink test specimen was allowed to dry at room temperature and humidity (20° C., 50% R.H.) until no liquid was visible. After drying, the surface resistivity was measured using a Lucas Labs 4-point probe. At least 27 data points were collected for the test specimen. The average surface resistivity for the sintered test specimen was 24 kOhms/square.

Example 5

Conductive Ink Formulation 3
Ink Formulation 0.12 g multi-wall carbon nanotubes, 0.12 g silver nanoparticles, 1.00 g sodium dodecyl sulfate, and 48.8 g deionized water were placed in a container and the mixture was agitated for 30 seconds by shaking. The container was placed in an ice bath and the dark suspension was mixed using a SONICS VCX-750 ultrasonic probe for 60 minutes at 32% amplitude. Care was taken to ensure that only ~¼ inch of the probe tip was below the surface of the liquid during the sonication process. The sonication process was performed 3 times, providing a total of 180 minutes of mixing. Ice was added to the ice bath as necessary to keep the container full. The dark suspension was capped and stored for printing.

Processing and Evaluation

The printed conductive ink test specimen was allowed to dry at room temperature and humidity (20° C., 50% R.H.) until no liquid was visible. After drying, the surface resistivity was measured using a Lucas Labs 4-point probe. At least 27 data points were collected for each test specimen. The average surface resistivity for the unsintered test specimen was 1.4 kOhms/square. The test specimen was cut into three individual test specimens to evaluate the effect of sintering on surface resistivity. An individual test specimen was placed in an oven and sintered at 130° C. for 1 hour. After sintering, the individual specimen was cooled to room temperature and the surface resistivity was measured using a Lucas Labs 4-point probe. At least 27 data points were collected for the test specimen. The average surface resistivity for the sintered individual test specimen was 0.8 kOhms/square. A second individual test specimen was placed in an oven and sintered at 170° C. for 1 hour. After sintering, the individual specimen was cooled to room temperature and the surface resistivity was measured using a Lucas Labs 4-point probe. At least 27 data points were collected for the test specimen. The average surface resistivity for the sintered individual test specimen was 0.6 kOhms/square.

Example 6

Conductive Ink Formulation 4
Ink Formulation 0.12 g multi-wall carbon nanotubes (carboxylic acid functionalized), 1.00 g sodium dodecyl sulfate, and 49.0 g deionized water were placed in a container and the mixture was agitated for 30 seconds by shaking. The container was placed in an ice bath and the dark suspension was mixed using a SONICS VCX-750 ultrasonic probe for 60 minutes at 32% amplitude. Care was taken to ensure that only ~¼ inch of the probe tip was below the surface of the liquid during the sonication process. The sonication process was performed 3 times, providing a total of 180 minutes of mixing. Ice was added to the ice bath as necessary to keep the container full. The dark suspension was capped and stored for printing.

Processing and Evaluation

The printed conductive ink test specimen was allowed to dry at room temperature and humidity (20° C., 50% R.H.) until no liquid was visible. After drying, the surface resistivity was measured using a Lucas Labs 4-point probe. At least 27 data points were collected for the test specimen. The average surface resistivity for the sintered test specimen was 14 kOhms/square.

Example 7

Conductive Ink Formulation 5
Ink Formulation 0.12 g multi-wall carbon nanotubes (carboxylic acid functionalized), 0.12 g silver nanoparticles, 1.00 g sodium dodecyl sulfate, and 48.8 g deionized water were placed in a container and the mixture was agitated for 30 seconds by shaking. The container was placed in an ice bath and the dark suspension was mixed using a SONICS VCX-750 ultrasonic probe for 60 minutes at 32% amplitude. Care was taken to ensure that only ~¼ inch of the probe tip was below the surface of the liquid during the sonication process. The sonication process was performed 3 times, providing a total of 180 minutes of mixing. Ice was added to the ice bath as necessary to keep the container full. The dark suspension was capped and stored for printing.

Processing and Evaluation
Transparency Film

The printed conductive ink test specimen was allowed to dry at room temperature and humidity (20° C., 50% R.H.)

until no liquid was visible. After drying, the surface resistivity was measured using a Lucas Labs 4-point probe. At least 27 data points were collected for each test specimen. The average surface resistivity for the unsintered test specimen was 1.98 kOhms/square. The test specimen was placed in an oven and sintered at 170° C. for 1 hour. After sintering, the test specimen was cooled to room temperature and the surface resistivity was measured using a Lucas Labs 4-point probe. At least 27 data points were collected for the test specimen. The average surface resistivity for the sintered individual test specimen was 0.34 kOhms/square.

KAPTON®

The printed conductive ink test specimen was allowed to dry at room temperature and humidity (20° C., 50% R.H.) until no liquid was visible. After drying, the test specimen was placed in an oven and sintered at 170° C. for 1 hour. After sintering, the test specimen was cooled to room temperature and the surface resistivity was measured using a Lucas Labs 4-point probe. At least 27 data points were collected for the test specimen. The average surface resistivity for the sintered individual test specimen was 1.2 kOhms/square.

Surface Treated Polytetraflouroethylene (PTFE)

The printed conductive ink test specimen was allowed to dry at room temperature and humidity (20° C., 50% R.H.) until no liquid was visible. After drying, the test specimen was placed in an oven and sintered at 170° C. for 1 hour. After sintering, the test specimen was cooled to room temperature and the surface resistivity was measured using a Lucas Labs 4-point probe. At least 27 data points were collected for the test specimen. The average surface resistivity for the sintered individual test specimen was 1.7 kOhms/square.

PTFE

The printed conductive ink test specimen was allowed to dry at room temperature and humidity (20° C., 50% R.H.) until no liquid was visible. After drying, the test specimen was placed in an oven and sintered at 170° C. for 1 hour. After sintering, the test specimen was cooled to room temperature and the surface resistivity was measured using a Lucas Labs 4-point probe. At least 27 data points were collected for the test specimen. The average surface resistivity for the sintered individual test specimen was 3.5 GOhms/square.

KYNAR®

The printed conductive ink test specimen was allowed to dry at room temperature and humidity (20° C., 50% R.H.) until no liquid was visible. After drying, the test specimen was placed in an oven and sintered at 170° C. for 1 hour. After sintering, the test specimen was cooled to room temperature and the surface resistivity was measured using a Lucas Labs 4-point probe. At least 27 data points were collected for the test specimen. The average surface resistivity for the sintered individual test specimen was 6.3 GOhms/square.

TEFZEL®

The printed conductive ink test specimen was allowed to dry at room temperature and humidity (20° C., 50% R.H.) until no liquid was visible. After drying, the test specimen was placed in an oven and sintered at 170° C. for 1 hour. After sintering, the test specimen was cooled to room temperature and the surface resistivity was measured using a Lucas Labs 4-point probe. At least 27 data points were collected for the test specimen. The average surface resistivity for the sintered individual test specimen was 1.5 kOhms/square.

Example 8

Conductive Ink Formulation 6
Ink Formulation 0.25 g Polystep B-1 surfactant and 49.5 g deionized water were placed in a container and mixed by shaking to dissolve the surfactant. 0.12 g multi-wall carbon nanotubes (carboxylic acid functionalized) and 0.12 g silver nanoparticles were added to the aqueous solution. The container was placed in an ice bath and the dark suspension was mixed using a SONICS VCX-750 ultrasonic probe for 60 minutes at 32% amplitude. Care was taken to ensure that only ~¼ inch of the probe tip was below the surface of the liquid during the sonication process. The sonication process was performed 3 times, providing a total of 180 minutes of mixing. Ice was added to the ice bath as necessary to keep the container full. A silver film was observed on the bottom of the tube, possibly indicating that some of the silver had plated out of solution. The dark suspension was capped and stored for printing.

Processing and Evaluation

The printed conductive ink test specimen was allowed to dry at room temperature and humidity (20° C., 50% R.H.) until no liquid was visible. After drying, the test specimen was placed in an oven and sintered at 170° C. for 1 hour. After sintering, the test specimen was cooled to room temperature and the surface resistivity was measured using a Lucas Labs 4-point probe. At least 27 data points were collected for the test specimen. The average surface resistivity for the sintered individual test specimen was 1.1 kOhms/square.

Example 9

Conductive Ink Formulation 7
Ink Formulation 1.00 g sodium dodecyl sulfate and 48.8 g deionized water were placed in a container and the mixture was agitated for 30 seconds by shaking to dissolve the surfactant. 0.12 g graphene nanochips and 0.12 g silver nanoparticles were added to the aqueous solution. The container was placed in an ice bath and the dark suspension was mixed using a SONICS VCX-750 ultrasonic probe for 60 minutes at 32% amplitude. Care was taken to ensure that only ~¼ inch of the probe tip was below the surface of the liquid during the sonication process. The sonication process was performed 3 times, providing a total of 180 minutes of mixing. Ice was added to the ice bath as necessary to keep the container full. The ink formulation had more of a brownish appearance than the previous formulations prepared with carbon nanotubes. The dark suspension was capped and stored for printing.

Processing and Evaluation

The printed conductive ink test specimen was allowed to dry at room temperature and humidity (20° C., 50% R.H.) until no liquid was visible. After drying, the test specimen was placed in an oven and sintered at 170° C. for 1 hour. After sintering, the test specimen was cooled to room temperature and the surface resistivity was measured using a Lucas Labs 4-point probe. At least 27 data points were collected for the test specimen. The average surface resistivity for the sintered individual test specimen was 0.26 GOhms/square for the 20-pass sample.

Example 10

Conductive Ink Formulation 8
Ink Formulation
0.12 g multi-wall carbon nanotubes (carboxylic acid functionalized), 0.12 g silver nanoparticles, 1.00 g sodium dodecyl sulfate, and 48.8 g deionized water were placed in a container and the mixture was agitated for 30 seconds by shaking. The container was clamped to a ring stand at approximately 20% angle from vertical using a clamp and the tip of the container (~½ inch) was placed into a Branson Model 1510 ultrasonic bath. The mixture was agitated for 60 minutes using the ultrasonic bath, after which time a dark suspension was observed. The container was removed from the clamp and shaken vigorously for 30 seconds. The container was then re-clamped to the ring stand, placed in the ultrasonic bath, and sonicated for 60 minutes. After sonication, the container was removed from the clamp and shaken vigorously for 30 seconds. The container was then re-clamped to the ring stand, placed back in the ultrasonic bath, and sonicated for 60 minutes. A total of 180 minutes of sonication was performed. After sonication, the dark, black ink formulation was capped and stored for printing.
Processing and Evaluation
The printed conductive ink test specimen was allowed to dry at room temperature and humidity (20° C., 50% R.H.) until no liquid was visible. After drying, the test specimen was placed in an oven and sintered at 170° C. for 1 hour. After sintering, the test specimen was cooled to room temperature and the surface resistivity was measured using a Lucas Labs 4-point probe. At least 27 data points were collected for the test specimen. The average surface resistivity for the sintered individual test specimen was 5.1 kOhms/square at 20 passes.

Example 11

Conductive Ink Formulation 9
Ink Formulation
0.13 g multi-wall carbon nanotubes (carboxylic acid functionalized), 0.12 g silver nanoparticles, and 50 ml of 1.64% ZeMac™ E400 in deionized water were placed in a container and the mixture was agitated for 30 seconds by shaking. The container was clamped to a ring stand at approximately 20% angle from vertical using a clamp and the tip of the container (~½ inch) was placed into a Branson Model 1510 ultrasonic bath. The mixture was agitated for 60 minutes using the ultrasonic bath. The container was removed from the clamp and shaken vigorously for 30 seconds. The container was then re-clamped to the ring stand, placed in the ultrasonic bath, and sonicated for 60 minutes. After sonication, the container was removed from the clamp and shaken vigorously for 30 seconds. The container was then re-clamped to the ring stand, placed back in the ultrasonic bath, and sonicated for 60 minutes. A total of 180 minutes of sonication was performed. After sonication, the dark, black ink formulation was capped and stored for printing.
Processing and Evaluation
The printed conductive ink test specimen was allowed to dry at room temperature and humidity (20° C., 50% R.H.) until no liquid was visible. After drying, the test specimen was placed in an oven and sintered at 170° C. for 1 hour. After sintering, the test specimen was cooled to room temperature and the surface resistivity was measured using a Lucas Labs 4-point probe. At least 27 data points were collected for the test specimen. The average surface resistivity for the sintered individual test specimen was 24.6 MOhms/square at 20 passes.

Example 12

Damage Detection System for Surfaces
A conductive ink composed of an electrical conductor, surfactant, and aqueous solvent was added to a clean inkjet cartridge using a needle and syringe as described in the instructions for standard inkjet cartridge refill kits. The conductive ink was printed onto an inkjet transparency (substrate) using an inkjet printer in a pattern consisting of 5 series of lines 8.5 inches in length, with each series consisting of 6 individual lines. Each series of lines had different line widths and spacing between lines to provide information related to how thickness and spacing affected the conductivity of the lines. Line widths of 0.75, 1.5, and 3.0 (based on Microsoft Word 2007) and line spacing of 2.5 and 4.5 millimeters were printed in this particular study. The printed patterns were dried on the substrate and sintered between 130-170° C. to form the adherent conductive detection patterns. The end-to-end resistances of the printed conductive detection patterns were measured at a length of 7.5 inches using a digital multimeter. The results showed that there was a direct correlation between line thickness and end-to-end resistance; i.e., doubling the line width reduced the end-to-end resistance two fold. Also, on lines with noticeable damage the resistance was greatly increased, showing that the printed conductive detection patterns could be used to indicate damage to the surface of the substrate; an increase in end-to-end resistance of greater than 4 orders of magnitude was observed for some damaged patterns.

We claim:
1. A method of forming a conductive material comprising:
applying a conductive ink with a printer in single or multiple passes onto a substrate;
wherein the conductive ink comprises an electrical conductor selected from the group consisting of: carbon nanotubes, graphene, a polycyclic aromatic hydrocarbon, metal nanoparticles, an inherently conductive polymer (ICP) wherein the ICP is not PEDOT, ionic liquid, and combinations thereof; and
drying the conductive ink on the substrate to form an adherent conductive material on the substrate;
wherein (i) the conductive ink is applied in at least 10 passes; or (ii) the conductive ink comprises uncoated carbon nanotubes, functionalized carbon nanotubes, or metal-coated carbon nanotubes in suspension in a polar solvent comprising a detergent, ionic liquid, or anti-agglomeration agent; or (iii) the method further comprises sintering the adherent conductive material on the substrate at a temperature of 130-170° C.; or (iv) the substrate is magnetic before the applying step; or (v) during the applying step, a magnetic field is applied to the conductive ink from a source other than the substrate;
wherein the adherent conductive material has a surface resistivity of less than 100 Ohms/square;
wherein the adherent conductive material comprises a plurality of layers, wherein each layer is formed by applying a conductive ink in at least one pass, wherein at least two adjoining layers comprise different electrical conductors or different combinations of electrical conductors.

2. The method of claim 1 wherein one layer comprises carbon nanotubes without an inherently conductive polymer, and an adjacent layer comprises an inherently conductive polymer.

3. A method of producing a wire comprising a damage detection layer, the method comprising:
   obtaining a wire comprising a core conductor surrounded by an insulator; and
   applying a conductive ink with a printer in multiple passes onto the insulator;
   wherein the conductive ink comprises an electrical conductor selected from the group consisting of: carbon nanotubes, graphene, a polycyclic aromatic hydrocarbon, metal nanoparticles, an inherently conductive polymer (ICP), ionic liquid, and combinations thereof; and
   drying the conductive ink on the substrate to form the adherent conductive material on the insulator;
   wherein the adherent conductive material is adapted to be used in detecting damage to the wire.

4. The method of claim 3 further comprising applying an insulator material over the adherent conductive material to form an outer insulator layer over the adherent conductive material.

* * * * *